United States Patent Office 3,641,155
Patented Feb. 8, 1972

3,641,155
ALLENE POLYAMINES
Charles H. Tilford, Atlanta, Ga., and Thomas R. Blohm and Robert D. MacKenzie, Cincinnati, Ohio, assignors to Richardson-Merrell Inc., New York, N.Y.
No Drawing. Filed Apr. 1, 1969, Ser. No. 812,408
Int. Cl. C07c 87/24, 87/32, 87/50
U.S. Cl. 260—583 H                              20 Claims

ABSTRACT OF THE DISCLOSURE

Compounds which have activity in inhibiting the clotting of blood are selected from bases of the formula

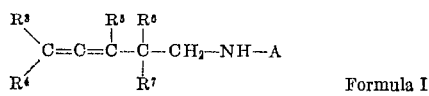

Formula I wherein:

(A) $R^3$ is hydrogen, (lower)alkyl or (lower)alkenyl;
(B) $R^4$ is (lower)alkyl or (lower)alkenyl;
(C) $R^3$ and $R^4$ taken together with the carbon atom to which they are attached is cycloalkyl of 5 to 7 ring carbon atoms;
(D) $R^5$ is hydrogen or (lower)alkyl;
(E) each of $R^6$ and $R^7$ is (lower)alkyl, (lower)alkenyl, or $R^6$ and $R^7$ together with the carbon atom to which they are attached is (i) cycloalkyl of 5 to 7 ring carbon atoms; (ii) cycloalkenyl of 5 to 7 ring carbon atoms; or (iii) bicycloalkyl selected from bornyl, norbornyl or norbornenyl;
(F) A is the group (i)

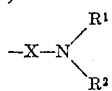

wherein X is alkylene of 2 to about 8 carbon atoms and separates the adjacent nitrogen atoms by an alkylene chain of at least 2 carbon atoms, monohydroxy alkylene of 3 to about 8 carbon atoms, and separates the adjacent nitrogen atoms by an alkylene chain of at least 3 carbon atoms, or a cycloalkyl-substituted alkylene group of the formula

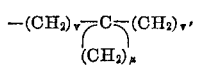

wherein each of ($v$) and ($v'$) is an integer of 0 to 4, ($\mu$) is an integer of 3 to 5 provided that at least one of ($v$) and ($v'$) is 1, and the total of ($v$), ($v'$) and ($\mu$) is not greater than 8, $R^1$ is hydrogen, (lower)alkyl, phenyl, hydroxy(lower)alkyl, cycloalkyl of 4 to 6 ring carbon atoms, di(lower)alkylamino(lower)alkyl, pyridyl(lower)alkyl, piperidyl(lower)alkylamino(lower)alkyl, or piperidyl(loweralkyl, $R^2$ is hydrogen, (lower)alkyl or hydroxy(lower)alkyl, or $R^1$ and $R^2$ taken together with the nitrogen to which they are attached is piperazino, N-(lower)alkylpiperazino, morpholino, pyrrolidino, aziridino, piperidino, (lower)alkylpiperidino, (lower)alkylimidazolidino, or (ii) A is

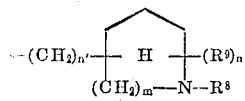

wherein ($n'$) is an integer of 0 to 3, ($m$) is an integer of 1 or 2, $R^8$ is hydrogen, (lower)alkyl, (lower)alkenyl, hydroxy(lower)alkyl, phenyl(lower)alkyl, cyano(lower)alkyl, piperidino(lower)alkyl, $R^9$ is (lower)alkyl; and ($n$) is an integer of 0 to 4; or pharmacologically acceptable acid addition salts of said bases.

This invention relates to novel allene polyamine compounds and processes for their preparation. More particularly, this invention relates to allene polyamine bases of the formula

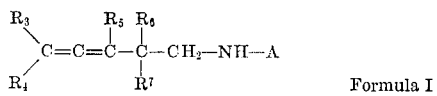

Formula I wherein:

(A) $R^3$ is hydrogen, (lower)alkyl or (lower)alkenyl;
(B) $R^4$ is (lower)alkyl or (lower)alkenyl;
(C) $R^3$ and $R^4$ taken together with the carbon atom to which they are attached is cycloalkyl of 5 to 7 ring carbon atoms;
(D) $R^5$ is hydrogen or (lower alkyl);
(E) each of $R^6$ and $R^7$ is (lower)alkyl, (lower)alkenyl, or $R^6$ and $R^7$ together with the carbon atom to which they are attached is (i) cycloalkyl of 5 to 7 ring carbon atoms; (ii) cycloalkenyl of 5 to 7 ring carbon atoms; or (iii) bicycloalkyl selected from bornyl, norbornyl or norbornenyl;
(F) A is the group (i)

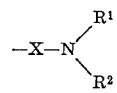

wherein X is alkylene of 2 to about 8 carbon atoms and separates the adjacent nitrogen atoms by an alkylene chain of at least 2 carbon atoms, monohydroxy alkylene of 3 to about 8 carbon atoms, and separates the adjacent nitrogen atoms by an alkylene chain of at least 3 carbon atoms, or a cycloalkyl-substituted alkylene group of the formula

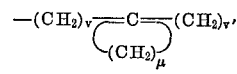

wherein each of $v$ and $v'$ is an integer of 0 to 4, $\mu$ is an integer of 3 to 5 provided that at least one of $v$ and $v'$ is 1, and the total of $v$, $v'$ and $\mu$ is not greater than 8, $R^1$ is hydrogen, (lower)alkyl, phenyl, hydroxy(lower)alkyl, cycloalkyl of 4 to 6 ring carbon atoms, di(lower)alkylamino(lower)alkyl, pyridyl(lower)alkyl, piperidyl(lower)alkylamino(lower)alkyl, or piperidyl(lower)alkyl, $R^2$ is hydrogen, (lower)alkyl or hydroxy(lower)alkyl, or $R^1$ and $R^2$ taken together with the nitrogen to which they are attached is piperazino, N-(lower)alkylpiperazino, morpholino, pyrrolidino, aziridino, piperidino, (lower)alkylpiperidino, (lower)alkylimidazolidino, or (ii) A is

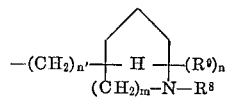

wherein $n'$ is an integer of 0 to 3, $m$ is an integer of 1 or 2, $R^8$ is hydrogen, (lower)alkyl, (lower)alkenyl, hydroxy(lower)alkyl, phenyl(lower)alkyl, cyano(lower)alkyl, piperidino(lower)alkyl, $R^9$ is (lower)alkyl; and $n$ is an integer of 0 to 4; and pharmacologically acceptable acid addition salts of such base form of the compounds. The compounds of this invention inhibit the clotting of blood when administered to animals.

In the above Formula I, $R^3$ can be hydrogen, (lower)alkyl or (lower)alkenyl. $R^4$ can be (lower)alkyl or (lower)alkenyl. Preferably, both $R^3$ and $R^4$ are (lower)alkyl. Apart from each $R^3$ and $R^4$ being a separate group, $R^3$ and $R^4$, taken together with the carbon atom to which they are attached, can be cycloalkyl of 5 to 7 ring carbon atoms. Illustrative of such cycloalkyls and other cycloalkyl groups in the compounds of this invention wherein the cycloalkyl has 5 to 7 ring carbon atoms, there can be mentioned cyclopentyl, cyclohexyl and cycloheptyl.

The term (lower) as used herein to describe alkyl or hydroxyalkyl relates to alkyl or hydroxyalkyl groups having from 1 to 6 carbon atoms. Such groups can be straight chained or branched chained. Illustrative of (lower)alkyls as can be represented by various designators, e.g., $R^6$, in the formulas of compounds of this invention, there can be mentioned: methyl, ethyl, n-propyl, isopropyl, n-butyl, secondary butyl, tertiary butyl, isoamyl, n-pentyl, n-hexyl and the like. Illustrative of (lower)hydroxyalkyl there can be mentioned: 2-hydroxyethyl, 2- and 3-hydroxypropyl, 4-hydroxybutyl, 2-hydroxy-1,1-dimethylethyl, hydroxypentyl, hydroxyhexyl and the like.

The term (lower) as used herein to described alkenyl relates to alkenyl having from 3 to 6 carbon atoms. Illustrative of (lower)alkenyl groups as can be represented by various designators in formulas of the compounds of this invention, there can be mentioned: allyl, 3-butenyl, 2-pentenyl, 4-hexenyl and the like.

$R^5$ in the above Formula I can be hydrogen or (lower) alkyl. Preferably, $R^5$ is hydrogen.

Each of $R^6$ and $R^7$ in Formula I can be (lower)alkyl or (lower)alkenyl. As (lower)alkyls or (lower)alkenyls, each of the $R^6$ and $R^7$ groups can be the same or different. Additionally, $R^6$ and $R^7$ together with the carbon atom to which they are attached can be cycloalkyl or cycloalkenyl of 5 to 7 carbon atoms, e.g., cyclohexyl, cyclohex - 3 - enyl, or bicycloalkyl such as norbornenyl, norbornyl or bornyl. Preferably, each of $R^6$ and $R^7$ is (lower)alkyl and particularly (lower)alkyl of about 2 to 4 carbon atoms.

It can be seen from the previous description of the above Formula I that the designator A can be (i) the group

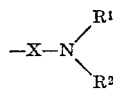

or (ii) the group

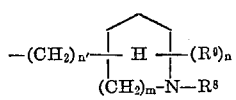

These groups will be described more fully hereinbelow. Preferably, such group is

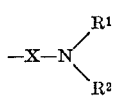

When A is the group

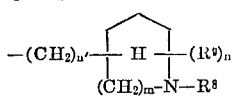

($n'$) can be an integer of 0 to 3 and preferably 1 to 3; ($m$) is an integer of 1 to 2, $R^9$ is (lower)alkyl, ($n$) is an integer of 0 to 4 and preferably 0, and $R^8$ is hydrogen, (lower)alkyl, (lower)alkenyl, hydroxy(lower)alkyl, preferably of 1 to 3 carbon atoms phenyl(lower)alkyl, cyano(lower)alkyl, or piperidino(lower)alkyl. Preferably the phenyl(lower)alkyl, cyano(lower)alkyl and the piperidino(lower)alkyl have from 1 to 3 carbon atoms in the alkyl group. The hydrogen in the ring simply denotes a saturated ring such as that of piperidyl or pyrrolidyl which can be attached to the $(-CH_2-)_{n'}$ group or directly to the adjacent secondary amine through any of the ring carbon atoms of said saturated cyclic group. Preferred bases of such compounds can be represented by the following formula:

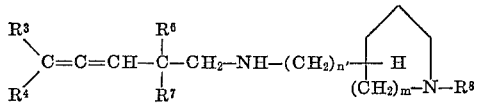

Formula II wherein each of $R^3$, $R^4$, $R^6$ and $R^7$ is (lower)alkyl, ($n'$) is an integer of 1 to 3, ($m$) is an integer of 1 or 2, and $R^8$ is hydrogen, (lower)alkyl, (lower)alkenyl, hydroxy-(lower)alkyl of 1 to 3 carbon atoms, phenyl(lower)alkyl having 1 to 3 carbon atoms in the alkyl group, cyano-(lower)alkyl having 1 to 3 carbon atoms in the alkyl group, or piperidino(lower)alkyl having 1 to 3 carbon atoms in the alkyl group; or pharmaceutically acceptable acid addition salts of said bases.

As shown by the above Formula I, A can also be an amino or polyamino group as represented by

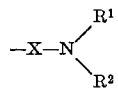

The designator X can be: straight or branched chain alkylene having from 2 to 8 carbon atoms which separates the above shown amino nitrogen from the adjacent nitrogen, i.e., that in the —NH— group of Formula I by an alkylene chain of at least 2 carbon atoms, e.g., ethylene ($-CH_2-CH_2-$) and preferably straight chain alkylene of 2 to 4 carbon atoms; straight or branched chain monohydroxy-substituted alkylene which separates the adjacent nitrogen atoms by an alkylene chain of at least 3 carbon atoms; or a cycloalkyl-substituted alkylene as described hereinbefore. As stated hereinabove, the alkylene or hydroxyalkylene separates the two nitrogen atoms, i.e., that adjacent to A in Formula I from the

group, by an alkylene chain of at least 2 carbon atoms in the case of alkylene and at least 3 carbon atoms in the case of hydroxyalkylene. Thus, these two nitrogens are not attached to the same carbon atom. X is preferably alkylene of 2 to 6 carbon atoms. When X in the

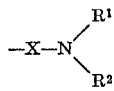

is alkylene and each of the $R^1$ and $R^2$ groups is (lower)alkyl, such group is also referred to herein simply as di(lower)alkylaminoalkyl. Preferred compounds containing the

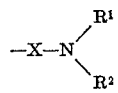

group are those which can be represented in the base form by the formula

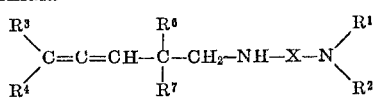

wherein: each of $R^3$, $R^4$, $R^6$ and $R^7$ is (lower)alkyl; X is alkylene of 2 to 6 carbon atoms and separates its adjacent nitrogen atoms by an alkylene chain of at least 2 carbon atoms; $R^1$ is hydrogen, (lower)alkyl, phenyl, hydroxy lower)alkyl, cycloalkyl of 5 to 7 ring carbon atoms, di (lower)alkylamino(lower)alkyl, pyridyl(lower)alkyl, piperidyl(lower)alkylamino(lower)alkyl, or piperidyl(lower)alkyl; $R^2$ is hydrogen, (lower)alkyl, or hydroxy(lower)alkyl; or $R^1$ and $R^2$ together with the nitrogen to which they are attached is piperazino, N-(lower)alkylpiperazino, morpholino, pyrrolidino, aziridino, piperidino (lower) alkylpiperidino or (lower)alkylimidazolidino. In the various groups for $R^1$ having an alkyl bridging group between a heterocyclic ring and the nitrogen of an amino group or between two amino groups, such alkyl is preferably (lower)alkyl of 1 to 3 carbon atoms and the heterocyclic ring, e.g., pyridyl, piperidyl, can be attached to such (lower)alkyl of 1 to 3 carbon atoms through any carbon atom of the heterocyclic ring. One of the nitrogens of an amino group referred to in the above sentence can be the nitrogen to which $R^1$ is attached.

The novel compounds of this invention can be prepared by various methods. By one method, an allene aldehyde is allowed to react with a polyamine to obtain an imine condensation intermediate product. The imine unsaturation of such product is then reduced to obtain compounds of this invention. The chemical equations of this procedure are shown below under Method A. The allene aldehyde reactants are known compounds or can be prepared by conventional procedures. U.S. Pat. 3,225,102, which issued on Dec. 21, 1965, shows suitable allene aldehyde reactants. Further, Example 3 herein shows the preparation of such allene aldehydes by certain techniques, whereas Table I shows properties of additional allene aldehyde prepared by the process employed in Example 3 herein.

Alternatively, the compounds can be prepared by the reaction of an allene aldehyde with hydroxylamine in order to obtain a hydroxylimine thereof which is subsequently reduced to the corresponding amine and then reacted with an amine aldehyde simultaneously with reduction or followed by reduction of the imine. The chemical equations for this procedure are shown below under Method B. In the following Methods A and B, the various groups, e.g., $R^3$, $R^4$, $R^5$, $R^6$, $R^7$ and A, have the same meanings as those given hereinbefore, whereas $KBH_4$ represents potassium borohydride and LAH represents lithium aluminum hydride.

Method A

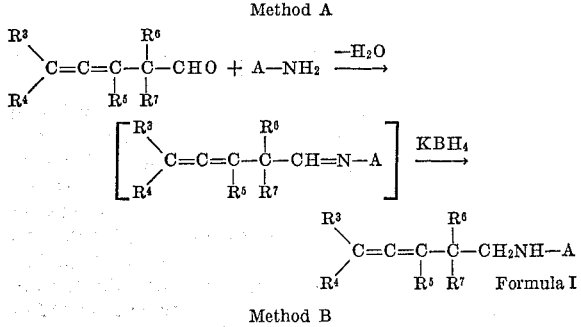

Method B

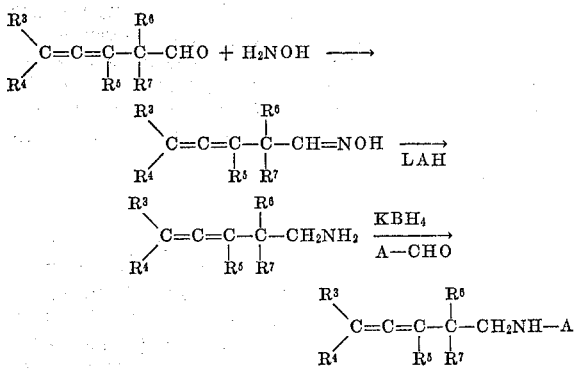

In the above Method A, the molar ratio of allene aldehyde to polyamine reactant can vary over a wide range such as that of about 0.5 to 2 moles of the polyamine per mole of the allene aldehyde. Preferably, however, the allene aldehyde and polyamine are used in equimolar ratios. The reaction is effected by contacting the allene aldehyde with the polyamine, preferably in an inert organic solvent, and heating the reaction mixture. Illustrative of inert organic solvents which can be used there can be mentioned various hydrocarbons such as toluene, benzene or xylene; and alcohols e.g., methanol, ethanol, and the like. The temperature at which the reaction mixture is heated can vary over a wide range such as that of a temperature of about 65° C. to 140° C. The heating is advantageously effected by refluxing the reactants in the inert solvent. During the condensation reaction, the theoretical amount of water is preferably removed from the reaction mixture. The reaction time can vary over a wide range, and usually from about one-half to about 3 hours, although for convenience the mixture can reflux overnight or longer.

The intermediate imine of the Method A procedure can be isolated and purified if desired, or the solvent can simply be removed, for example, by distillation or evaporation and then the imine reduced, to eliminate the imine unsaturation, with a reducing agent such as sodium or potassium borohydride. The quantity of such borohydride cannot vary over a wide range, but it is generally in excess of the theoretical amount necessary for the reduction, for example, from about 2 to 25 moles of the borohydride per mole of the amine. The borohydride reducing agent is preferably used together with an organic solvent such as methanol. The quantity of such solvent can vary over a wide range such as about 100 ml. for each tenth mole of each reactant, although this can vary over a wide range such as about 50 to 200 ml. of the solvent per tenth mole of each reactant. In place of methanol, other solvents can be used such as other (lower)alkanols, e.g., ethanol. However, when other alkanols are used, it is preferred that the reaction mixture be warmed to about 40° C. to 50° C. after the amine addition. This increases the solubility of the borohydride and hastens the reaction.

In the usual procedure for reduction of the imine unsaturation, the imine is added to a cooled, for example, about 10° C. to 15° C., stirred mixture of potassium borohydride ($KBH_4$) in methanol over a short period, e.g., 15 to 90 minutes, and preferably about 30 minutes. The mixture is then permitted to stand until completion of the reaction, e.g., from 2 hours to 3 days or more. After completion of the reaction, the solvent, for example, methanol, can be removed by evaporation. Water is then added to the reaction mixture to decompose the residue. The amount of water added is not critical and can vary over a wide range such as that of about 15 to 50 moles of water per mole of starting imine material, but preferably about 40 to 45 moles of water per mole of starting imine material. The final product of this Method A can be recovered from the reaction mixture by conventional techniques. Illustrative of such techniques there can be mentioned solvent extraction, for example, with naphtha, benzene, toluene, and the like.

In the Method B for preparation of the compounds of this invention, an allene hydroxylamine is prepared from an allene aldehyde and hydroxylamine. The allene hydroxylamine is then reduced, for example, with lithium aluminum hydride to obtain the primary amino compound which can be reacted with an amine aldehyde in the presence of potassium or sodium borohydride to obtain the compounds of this invention. This method is specifically illustrated in Examples 8-10.

Some of the compounds of this invention can be resolved to their $d$ and $l$ optical isomers.

The pharmacologically acceptable acid addition salts of the novel base compounds of this invention can be those of inorganic or organic acids. Illustrative of inorganic acids there can be mentioned: hydrochloric acid; hydrobromic acid; sulfuric acid; phosphoric acid; and the like. Illustrative of organic acids there can be mentioned: lactic acid; pyruvic acid; malonic acid; succinic acid; maleic acid; tartaric acid; malic acid; citric acid; and the like.

The novel compounds of this invention are anticoagulants. They have been found to prolong clotting time of blood when administered orally or parenterally to rats and to inhibit platelet aggregation such as that induced by the addition of adenosine diphosphate when added to samples of platelet-rich plasma. This is a new type of anticoagulant mechanism and is quite different from both heparin and dicumarol type anticoagulants. Heparin has an effect on blood coagulation both in vivo and in vitro due to its inhibition of the enzyme thrombin and fibrin clot formation. The dicumarol type affects the level of the proenzyme, prothrombin, in the blood by inhibiting its synthesis in the liver and is therefore effective only in vivo. The compounds of this invention have an effect on platelet function. This effect is found in vivo and in vitro. These anticoagulants can find particular utility in the treatment of thrombotic disease, especially of the arterial system, e.g. to inhibit thrombosis of coronary and cerebral arteries, where heparin and dicumarol type anticoagulants do not completely protect against formation of a thrombus. The compounds of this invention can be administered to animals, e.g., mammals such as rats or dogs, over a wide dosage range, e.g., daily doses from about 1 to 100 milligrams (mg.) per kilogram (kg.) of animal body weight and ordinarily from about 10 to 30 mg./kg. of animal body weight per day by oral route or somewhat less when administered parenterally. These anticoagulants can be administered in unit dosage form, e.g., in tablets, capsules or ampoules, together with a significant quantity of a pharmaceutical carrier containing from about 50 to 500 milligrams of the anticoagulant. These anticoagulants generally show little, and in some cases, an absence of hypotensive activity.

The following examples are illustrative of the invention.

EXAMPLE 1

Preparation of 2-butyl-N-(3-diethylaminopropyl)-2-ethyl-5-methyl-3,4-hexadienylamine A mixture of 26 g. of 3-diethylaminopropylamine, 39 g. of 2-butyl-2-ethyl-5-methyl-3,4-hexadienal, and 200 ml. of toluene was refluxed with an attached water-trap. After several hours, 3.5 ml. (98% of theory) of water had collected. The mixture was subjected to distillation using a rotary evaporator and the steam bath as the source of heat. The oily residue was added to a stirred mixture of 16 g. of potassium borohydride in 200 ml. of methanol with ice bath cooling; the time of addition was approximately a half hour. The mixture was stirred overnight (16–18 hours) and a clear solution resulted. It was rotary evaporated on the steam bath. To the viscous semi-solid residue was added 150 ml. of water with stirring. The oil that separated was extracted with about 150 ml. of naphtha and fractionally distilled. The subject compound was in the form of a colorless oil which distilled at 119–121° (0.28 mm.) and amounted to 42 g., $n_D^{28}$ 1.4695. Infrared spectra were in agreement with the structure. This is Compound No. 14 of Table II.

EXAMPLE 2

Preparation of 1-[1-(2-butyl-2-ethyl-5-methyl-3,4-hexadienyl-aminomethyl)cyclohexyl]piperidine The intermediate 1-piperidinocyclohexylmethylamine was prepared as follows. To a stirred mixture of 8 g. of lithium aluminum hydride in 280 ml. of tetrahydrofuran (dried over 5μ molecular sieves) was added 28 g. of commercial 1-piperidinocyclohexanecarboxamide in 5–7 g. portions with ice bath cooling. The mixture was stirred overnight at room temperature and decomposed with 30 ml. of a saturated sodium potassium tartrate solution. The mixture was filtered and the filtrate was fractionally distilled at 85–90° (0.5 mm.) to yield 18 g. of crude product. Infrared spectra indicated a small amount of unchanged starting carboxamide present.

A mixture of the above prepared base (18 g.), 21 ml. of 2-butyl-2-ethyl-5-methyl-3,4-hexadienal and 100 ml. of toluene was then processed in the same manner as in Example 1. The yield of the subject compound as a colorless oil distilling at 154–7° (0.15 mm.) was 22 g. This is Compound No. 37 of Table III.

A sample of the subject compound was dissolved in ether and alcoholic hydrogen chloride was added with cooling till the mixture was acid to congo red indicator paper. An oil precipitated that crystallized overnight at 5°. This dihydrochloride salt of the subject compound was recrystallized from acetone-ether. M.P. 184–6° dec.

EXAMPLE 3

Preparation of 2-(3-methyl-1,2-butadienyl)-5-norbornene-2-carboxaldehyde intermediate A mixture of 29 ml. of 3-methyl-1-butyn-3-ol, 37 g. of 5-norbornene-2-carboxaldehyde, 25 ml. of xylene, 25 ml. of benzene, 0.1 g. hydroquinone, and 4 drops of commercial Ultra Tx-acid (a liquid mixture of aromatic sulfonic acids) was refluxed for about 20 hours with an attached water-trap. Approximately the theoretical amount of water had collected. The mixture was shaken with 20 ml. of a saturated sodium bicarbonate solution. The oily layer was distilled. B.P. 116–118° (0.3 mm.); yield: 7 g. of the subject aldehyde 2-(3-methyl-1,2-butadienyl)-5-norbornene-2-carboxaldehyde. Infrared confirmed the functional groups. This is Compound No. 3 of Table I.

EXAMPLE 4

Preparation of N,N-diethyl-N'-[2-(3-methyl-1,2-butadienyl)-2-norbornen-5-ylmethyl]-1,3-propanediamine The procedure in Example 1 was followed using 5.5 g. of the above (Example 3) aldehyde. The oil distilling at 140–2° (0.2 mm.) amounted to 4 g. of the subject compound, N,N-diethyl-N'-[2-(3-methyl-1,2-butadienyl)-2-norbornen-5-ylmethyl]-1,3-propanediamine. This is Compound No. 60 in Table V.

EXAMPLE 5

Preparation of N-(2-aziridinoethyl)-2-butyl-2-ethyl-5-methyl-3,4-hexadienylamine When the procedure in Example 1 was followed with N-(2-aminoethyl)aziridine, some imine intermediate was a substantial contaminant as shown by infrared. The procedure was repeated using 85 g. of N-(2-aminoethyl)aziridine, 230 ml. of 2-butyl-2-ethyl-5-methyl-3,4-hexadienal and 1 liter of toluene. After a few hours refluxing, the theoretical amount (18 ml.) of water was collected. The reaction mixture was rotary evaporated, and the residue was added to 80 g. of potassium borohydride suspended in 1 liter of methanol with cooling. This time the mixture was stirred under reflux for 18–20 hours, and worked up as in Example 1. The desired product was collected as an oil distilling at 105–8° (0.45 mm.) and amounted to 109 g. Infrared analysis confirmed the presence of the functional groups with little or no C=N stretch. This is Compound No. 29 of Table III.

EXAMPLE 6

Preparation of 4-[2-(2-[2-butyl-2-ethyl-5-methyl-3,4-hexadienylamino]ethylamino)ethylaminomethyl]piperidine A solution of 13 g. of the above aziridine (Example 5), 11 g. of 4-aminomethylpiperidine, and 100 ml. of toluene was refluxed two days and distilled. The product, as a colorless oil distilling at 182–4° (0.2 mm.), amounted to 5.5 g. Infrared analysis showed the C=C=C group was present.

*Analysis.*—Calc'd (percent): C, 72.96; H, 12.25; N, 14.79. Found (percent): C, 72.72; H, 12.51; N, 14.80.

EXAMPLE 7

Preparation of N-(2-butyl-2-ethyl-5-methyl-3,4-hexadienyl)-1,3-diaminopropane

To 64 g. of 1,3-diaminopropane in 250 ml. of toluene was added 46 ml. of 2-butyl-2-ethyl-5-methyl-3,4-hexadienal over a period of four hours under reflux and stirring, with an attached water-trap. The mixture was stirred under reflux for about 18 hours (overnight); a total of 3 ml. (80%) of water had deposited. The reaction mixture was rotary evaporated on the steam bath, and the residue was added to a stirred and cooled mixture of 12 g. of potassium borohydride in 175 ml. of methanol during a half-hour period. The mixture was stirred for 16–18 hours, rotary evaporated on the steam bath, decomposed with water. The oil that separated was extracted with naphtha and fractionally distilled. At 110–1° (0.25 mm.) 25.5 g. of the desired product was collected. This is Compound No. 10 in Table II.

EXAMPLE 8

Preparation of 2 - butyl - 2-ethyl-5-methyl-3,4-hexadienal oxime intermediate

To 70 g. of hydroxylamine hydrochloride in 500 ml. of 85% methanol was added 60 g. of potassium hydroxide in 20 ml. of water. Then 230 ml. of 2-butyl-2-ethyl-5-methyl-3,4-hexadienal in 500 ml. of methanol was added over a period of about 30 minutes. The reaction mixture was stirred at about 60° for 18 hours. The solvent was distilled under rotary evaporation on the steam bath. The residue was extracted with 500 ml. of naphtha and fractionally distilled; B.P. 112–3° (0.35 mm.), yield: 176 g. of the product. Infrared analysis confirmed the designated structure. This compound had very little —C=N— stretch.

EXAMPLE 9

Preparation of 2-butyl-2-ethyl-5-methyl-3,4-hexadienylamine intermediate

To 40 g. of lithium aluminum hydride in 900 ml. of tetrahydrofuran was added 165 g. of the above oxime (Example 8) in 165 ml. of tetrahydrofuran over an eight-hour period under mild reflux. The mixture was stirred for about 16 hours at room temperature, and 200 ml. of a saturated sodium potassium tartrate solution was added with cooling. The mixture was filtered, and the filtrate was fractionally distilled. The product, as a colorless oil, collected at 75–80° (0.18 mm.), amounted to 130 g.

EXAMPLE 10

Preparation of N-(2-butyl-2-ethyl-5-methyl-3,4-hexadienyl)-N',N'-diethyl-2,2-dimethyl-1,3-propanediamine A mixture of 23 ml. of 2-butyl-2-ethyl-5-methyl-3,4-hexadienylamine (Example 9), 16 g. of 3-diethylamino-2,2-dimethylpropionaldehyde and 100 ml. of toluene was used in an experiment following the procedure of Example 1. The product, distilling at 133–5° (0.2 mm.), amounted to 16 g. This is Compound No. 24 in Table II.

EXAMPLE 11

Preparation of N-(2-butyl-2-ethyl-5-methyl-3,4-hexadienyl)-1-methyl-2-pyrrolidineethylamine The procedure in Example 1 was followed using 5 g. (0.04 mole) 2-(2-aminoethyl)-1-methylpyrrolidine, 9 ml. (0.04 mole) of 2-butyl-2-ethyl-5-methyl-3,4-hexadienal, and 40 ml. of toluene. The desired product after potassium borohydride reduction distilled at 122–5°/0.2 mm.; yield 8 g. This is Compound No. 31 of Table III.

EXAMPLE 12

Preparation of N,N-diethyl-N'-(2,2,5-trimethyl-3,4-undecadienyl)-1,3-propanediamine The procedure of Example 1 was carried out using 11 g. (0.05 mole) of 2,2,5-trimethyl-3,4-undecadienal, 8 ml. (0.05 mole) of 3-diethylaminopropylamine, and 70 ml. of toluene. Thirteen grams of desired product was collected at 128–130°/0.25 mm. This is Compound No. 55 of Table V.

EXAMPLE 13

Preparation of N-(2,2,5-trimethyl-3,4-undecadienyl) ethylenediamine

The above procedure was followed using 20 g. (0.1 mole) of the aldehyde with 6.1 g. (0.1 mole) ethylenediamine. The product distilling at 110–114°/0.3 mm. amounted to 5 g. This is Compound No. 50 of Table V.

EXAMPLE 14

Preparation of 2-butyl-N-(2-dimethylaminoethyl)-2-ethyl-5-methyl-3,4-hexadienylamine A mixture of 23 ml. (0.1 mole) 2-butyl-2-ethyl-5-methyl-3,4-hexadienal, 11 ml. of N,N-dimethylethylenediamine and 100 ml. of toluene was treated as in Example 1. The desired product was collected at 96–8°/0.25 mm. This is Compound No. 1 of Table II.

EXAMPLE 15

Preparation of 2-butyl-2-ethyl-N-[2-(2-hydroxyethylamino)-ethyl]-5-methyl-3,4-hexadienylamine The procedure in Example 1 with 21 g. (0.2 mole) of 2-(2-aminoethyl)aminoethanol, 46 ml. (0.2 mole) of 2-butyl-2-ethyl-5-methyl-3,4-hexadienal and 200 ml. of toluene gave a product distilling at 144–6°/0.3 mm. This is Compound No. 6 in Table II.

EXAMPLE 16

Preparation of 2-butyl-N-[2-(2-diethylaminoethylamino) ethyl]-2-ethyl-5-methyl-3,4-hexadienylamine The procedure in the above example using 32 g. (0.2 mole) of 1,1-diethyldiethylenetriamine as the starting amine gave 45 g. of desired product distilling at 145–8°/0.35 mm. This is Compound No. 7 in Table II.

EXAMPLE 17

Preparation of 2-butyl-2-ethyl-5-methyl-N-(3-methylaminopropyl)-3,4-hexadienylamine When N-methyl-1,3-propanediamine (9 g.—0.1 mole) was the amine in the above procedure, 16 g. of desired product was obtained distilling at 105–7°/0.15 mm. This is Compound No. 11 in Table II.

EXAMPLE 18

Preparation of 2-butyl-N-(3-dimethylaminopropyl)-2-ethyl-5-methyl-3,4-hexadienylamine Here the amine used was 3-dimethylaminopropylamine (21 g., 0.2 mole) with 38 g. of desired product distilling at 114–6°/0.4 mm. This is Compound No. 12 in Table II.

EXAMPLE 19

Preparation of 2-butyl-2-ethyl-N-[3-(2-hydroxyethylamino)propyl]-5-methyl-3,4-hexadienylamine The procedure of Example 15 was followed except the starting amine was 1,3-diamino-N-(β-hydroxyethyl) propane (24 g., 0.2 mole). The desired substituted 3,4-hexadienylamine was collected at 156–8°/0.3 mm. and amounted to 27 g. This is Compound No. 16 in Table II.

EXAMPLE 20

Preparation of 2-butyl-N-(3-cyclohexylaminopropyl)-2-ethyl-5-methyl-3,4-hexadienylamine In the above procedure using 29 g. (0.2 mole) of 3-cyclohexylaminopropylamine, 51 g. of the substituted 3,4-hexadienylamine was obtained distilling at 150–2°/0.3 mm.; $n_D^{24}$ 1.4880. This is Compound No. 18 in Table II.

EXAMPLE 21

Preparation of 2-butyl-N-(3-diethylamino-2-hydroxypropyl)-2-ethyl-5-methyl-3,4-hexadienylamine In this example, the amine used in the above procedure was 28 g. (0.2 mole) of 3-diethylamino-2-hydroxypropylamine. A yield of 47 g. of desired product was obtained distilling at 140–2°/0.28 mm. This is Compound No. 23 in Table II.

EXAMPLE 22

Preparation of N-(2-butyl-2-ethyl-5-methyl-3,4-hexadienyl)-1-pyrrolidineethylamine The procedure of Example 1 was followed with 23 g. (0.2 mole) of N-(2-aminoethyl)pyrrolidine, 46 ml. (0.2 mole) of 2-butyl-2-ethyl-5-methyl-3,4-hexadienal, and 200 ml. toluene. At 125–6°/0.3 mm., 39 g. of desired product was collected as a colorless oil. This is Compound No. 28 in Table III.

EXAMPLE 23

Preparation of 2-butyl-2-ethyl-5-methyl-N-(1-methyl-4-piperidylmethyl)-3,4-hexadienylamine A mixture of 4 g. (0.03 mole) 4-aminomethyl-N-methylpiperidine, 7 g. (0.03 mole) of 2-butyl-2-ethyl-5-methyl-3,4-hexadienal, 25 ml. of toluene was refluxed as in Example 1. After reduction by potassium borohydride, 6 g. of desired product was collected at 128–9°/0.35 mm. This is Compound No. 41 of Table IV.

EXAMPLE 24

Preparation of N,N-diethyl-N'-[1 - (3 - methyl - 1,2-butadienyl) - 3 - cyclohexen - 1 - ylmethyl) - 1,3-propanediamine A mixture of 27 g. (0.15 mole) of 1-(3-methyl-1,2-butadienyl) - 3 - cyclohexenecarboxaldehyde (No. 2 of Table I), 24 ml. (0.15 mole) of 3-diethylaminopropylamine, and 150 ml. of toluene was refluxed in an apparatus having an attached water-trap. After 2.7 ml. of water had collected, the reaction mixture was evaporated on the rotary at 20 mm. and steam bath temperatures. The residue was added to 12 g. of potassium borohydride in 150 ml. of methanol with ice bath cooling. The addition took approximately 30 minutes. The reaction mixture was stirred at room temperature overnight, rotary evaporated under the conditions above and the residue was decomposed with 100 ml. of water. The oil that separated was extracted with naphtha and fractionally distilled. At 117–120°/0.18 mm., 34 g. of desired material distilled as a colorless oil. This is Compound No. 57 of Table V.

EXAMPLE 25

Preparation of N-[2-(1-butenyl)-2-ethyl-5-methyl-3,4-heptadienyl]-N',N'-diethyl-1,3-propanediamine The above procedure of Example 24 was carried out using 11 g. (0.05 mole) of 2-(1-butenyl)-2-ethyl-5-methyl-3,4-heptadienal, 8 ml. of 3-diethylaminopropylamine, and 70 ml. of toluene. The yield of colorless oil distilling at 120–1°/0.15 mm. was 14 g. This Compound is No. 53 in Table V.

EXAMPLE 26

Preparation of 2-butyl-N-(4-diethylamino-1-methylbutyl)-2-ethyl-5-methyl-3,4-hexadienylamine The preceding procedure was followed with 25 g. (0.125 mole) of 2-amino-5-diethylaminopentane, 36 ml. of 2-butyl-2-ethyl-5-methyl - 3,4 - hexadienal, and 200 ml. of toluene. The desired product obtained distilled at 132–4°/0.25 mm. and amounted to 45 g. This is Compound No. 25 of Table II.

The following Table I shows some of the aldehyde intermediates which can be used in preparing compounds of this invention. The following Tables II–V show compounds of this invention together with analytical data. The same identifying compound number is used in the Tables II to V and in the examples for compounds of this invention although the numbering is not in consecutive order.

TABLE I

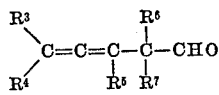

| No. | R³ | R³R⁴C | R⁴ | R⁵ | R⁶ | R⁶R⁷C | R⁷ | B.P. °C. | Mm. | Molecular formula | Calc. C | Calc. H | Found C | Found H |
|---|---|---|---|---|---|---|---|---|---|---|---|---|---|---|
| 1 | CH₂=CHCH₂CH₂— | | CH₃ | H | C₂H₅ | | C₄H₉ | 96–9 | 0.15 | C₁₆H₂₈O | 82.00 | 11.18 | 82.51 | 10.99 |
| 2 | CH₃ | | CH₃ | H | | ⟨⟩ | | 65–8 | 0.20 | C₁₂H₁₆O | 81.77 | 9.15 | 81.55 | 9.26 |
| 3 | CH₃ | | CH₃ | H | | ⟨⟩ | | 116–8 | 0.30 | C₁₃H₁₈O | 82.93 | 8.57 | 83.01 | 8.65 |
| 4 | | ⟨⟩= | | H | C₂H₅ | | C₄H₉ | 96–9 | 0.10 | C₁₆H₂₆O | 81.99 | 11.18 | 82.08 | 11.10 |
| 5 | | ⟨⟩= | | H | | ⟨⟩ | | 96 | 0.15 | C₁₅H₂₀O | 83.28 | 9.32 | 83.28 | 9.40 |

TABLE II $$(CH_3)_2C=C=CH-\underset{\underset{C_4H_9}{|}}{\overset{\overset{C_2H_5}{|}}{C}}-CH_2-NH-A-N\underset{R_2}{\overset{R^1}{<}}$$

| No. | A | R¹ | R² | B.P. °C. | Mm. | Molecular formula | Calculated C | Calculated H | Calculated N | Found C | Found H | Found N |
|---|---|---|---|---|---|---|---|---|---|---|---|---|
| 1 | —(CH₂)₂— | CH₃ | CH₃ | 96–8 | 0.25 | C₁₇H₃₄N₂ | 76.62 | 12.86 | 10.52 | 76.84 | 12.80 | 10.69 |
| 2 | Same as above | C₂H₅ | C₂H₅ | 117–9 | 0.35 | C₁₉H₃₈N₂ | 77.48 | 13.01 | 9.51 | 77.54 | 13.16 | 9.68 |
| 3 | do | i-C₃H₇ | i-C₃H₇ | 127–8 | 0.30 | C₂₁H₄₂N₂ | 78.18 | 13.13 | 8.69 | 77.80 | 13.16 | 8.80 |
| 4 | do | n-C₃H₇ | n-C₃H₇ | 124–5 | 0.30 | C₂₁H₄₂N₂ | 78.18 | 13.13 | 8.69 | 77.77 | 12.86 | 9.17 |
| 5 | do | C₂H₅ | n-C₄H₉ | 122–5 | 0.25 | C₂₁H₄₂N₂ | 78.18 | 13.13 | 8.69 | 78.24 | 13.17 | 8.88 |
| 6 | do | H | CH₂CH₂OH | 144–6 | 0.30 | C₁₇H₃₄N₂O | 72.29 | 12.13 | 9.92 | 72.39 | 12.35 | 10.06 |
| 7 | do | H | CH₂CH₂—N(C₂H₅)₂ | 145–8 | 0.35 | C₂₁H₄₅N₃ | 74.72 | 12.84 | 12.44 | 74.85 | 12.83 | 12.52 |
| 8 | do | H | CH₂-(pyridyl) | 174–5 | 0.30 | C₂₁H₃₅N₃ | 76.54 | 10.71 | 12.75 | 76.32 | 10.88 | 12.57 |
| 9 | do | H | CH₂-(piperidyl) | 160–2 | 0.20 | C₂₁H₄₁N₃ | 75.16 | 12.32 | 12.52 | 75.42 | 12.60 | 12.59 |
| 10 | —(CH₂)₃— | H | H | 110–1 | 0.25 | C₁₆H₃₂N₂ | 76.12 | 12.78 | 11.10 | 76.35 | 12.63 | 10.82 |
| 11 | Same as above | H | CH₃ | 105–7 | 0.15 | C₁₇H₃₄N₂ | 76.62 | 12.86 | 10.52 | 76.49 | 13.15 | 10.78 |
| 12 | do | CH₃ | CH₃ | 114–6 | 0.40 | C₁₈H₃₆N₂ | 77.06 | 12.94 | 9.99 | 77.20 | 12.73 | 10.03 |
| 13 | do | H | C₂H₅ | 111–3 | 0.30 | C₁₈H₃₆N₂ | 77.06 | 12.94 | 9.99 | 77.30 | 12.70 | 9.90 |
| 14 | do | C₂H₅ | C₂H₅ | 119–21 | 0.28 | C₂₀H₄₀N₂ | 77.85 | 13.07 | 9.08 | 77.80 | 13.14 | 9.27 |
| 15 | do | n-C₄H₉ | n-C₄H₉ | 146–8 | 0.20 | C₂₄H₄₈N₂ | 79.05 | 13.27 | 7.68 | 79.27 | 13.14 | 7.80 |
| 16 | do | H | CH₂CH₂OH | 156–8 | 0.30 | C₁₈H₃₆N₂O | 72.92 | 12.24 | 9.45 | 73.00 | 12.30 | 9.53 |
| 17 | do | —CH₂CH₂OH | —CH₂CH₂OH | 170–1 | 0.10 | C₂₀H₄₀N₂O₂ | 70.54 | 11.84 | 8.23 | 70.72 | 11.99 | 8.05 |
| 18 | do | H | (cyclohexyl) | 150–2 | 0.30 | C₂₂H₄₂N₂ | 78.97 | 12.65 | 8.37 | 78.92 | 12.50 | 8.27 |
| 19 | —(CH₂)₅— | CH₃ | CH₃ | 126–7 | 0.35 | C₂₀H₄₀N₂ | 77.85 | 13.07 | 9.08 | 77.62 | 12.98 | 9.14 |
| 20 | —(CH₂)₆— | CH₃ | CH₃ | 134–6 | 0.35 | C₂₁H₄₂N₂ | 78.18 | 13.13 | 8.69 | 78.21 | 13.26 | 8.74 |
| 21 | —C(CH₃)₂CH₂— | H | i-C₃H₇ | 110–2 | 0.20 | C₂₀H₄₀N₂ | 77.85 | 13.07 | 9.08 | 77.99 | 13.00 | 9.11 |
| 22 | Same as above | H | C(CH₃)₂CH₂OH | 134–7 | 0.25 | C₂₁H₄₂N₂O | 74.49 | 12.50 | 8.28 | 74.73 | 12.33 | 8.48 |
| 23 | —CH₂—CHOH—CH₂— | C₂H₅ | C₂H₅ | 140–2 | 0.28 | C₂₀H₄₀H₂O | 74.02 | 12.42 | 8.63 | 73.93 | 12.58 | 8.74 |
| 24 | —CH₂—C(CH₃)₂CH₂— | C₂H₅ | C₂H₅ | 133–5 | 0.20 | C₂₂H₄₄N₂ | 78.50 | 13.18 | 8.32 | 78.78 | 13.20 | 8.30 |
| 25 | —CH(CH₃)(CH₂)₃— | C₂H₅ | C₂H₅ | 132–4 | 0.25 | C₂₂H₄₄N₂ | 78.50 | 13.18 | 8.32 | 78.22 | 13.10 | 8.42 |

TABLE III $$(CH_3)_2C=C=CH-\underset{\underset{C_4H_9}{|}}{\overset{\overset{C_2H_5}{|}}{C}}-CH_2NH-A-NR^1R^2$$

| No. | A | NR¹R² | B.P. °C. | Mm. | Molecular formula | Calculated C | Calculated H | Calculated N | Found C | Found H | Found N |
|---|---|---|---|---|---|---|---|---|---|---|---|
| 26 | —(CH₂)₂— | —N(piperazinyl)NH | 130–7 | 0.20 | C₁₉H₃₇N₃ | 74.20 | 12.13 | 13.67 | 74.01 | 12.15 | 13.77 |
| 27 | Same as above | —N(morpholino)O | 136–7 | 0.30 | C₁₉H₃₆N₂O | 73.97 | 11.76 | 9.08 | 73.85 | 11.63 | 9.25 |
| 28 | do | —N(pyrrolidinyl) | 125–6 | 0.30 | C₁₉H₃₈N₂ | 78.02 | 12.41 | 9.58 | 78.14 | 12.36 | 9.37 |
| 29 | do | —N(aziridinyl) | 105–8 | 0.45 | C₁₇H₃₂N₂ | 77.21 | 12.20 | 10.59 | 77.57 | 11.96 | 10.42 |
| 30 | do | —N(2-methylimidazolyl) | 144–6 | 0.20 | C₁₉H₃₅N₃ | 74.70 | 11.55 | 13.76 | 74.38 | 11.98 | 13.55 |

TABLE III.—Continued

| No. | A | NR¹R² | B.P. °C. | Mm. | Molecular formula | Analysis Calculated C | H | N | Found C | H | N |
|---|---|---|---|---|---|---|---|---|---|---|---|
| 31 | ___do___ | (N-methylpiperidinyl) | 122–5 | 0.20 | $C_{20}H_{38}N_2$ | 78.36 | 12.50 | 9.14 | 78.21 | 12.34 | 8.91 |
| 32 | ___do___ | (piperidinyl-CH₂CH₂-piperidinyl-NH) | 195–9 | 0.20 | $C_{27}H_{51}N_3$ | 77.63 | 12.30 | 10.07 | 77.39 | 12.00 | 10.22 |
| 33 | —(CH₂)₃— | (piperidinyl) | 135–7 | 0.30 | $C_{21}H_{40}N_2$ | 78.68 | 12.58 | 8.74 | 78.47 | 12.56 | 8.80 |
| 34 | ___do___ | (N-C₃H₇ piperidinyl) | 150–3 | 0.20 | $C_{24}H_{46}N_2$ | 79.49 | 12.78 | 7.73 | 79.36 | 12.79 | 7.94 |
| 35 | ___do___ | (morpholinyl) | 136–8 | 0.15 | $C_{20}H_{38}N_2O$ | 74.48 | 11.87 | 8.69 | 74.70 | 12.01 | 8.50 |
| 36 | ___do___ | (N-methylpiperazinyl) | 137–8 | 0.20 | $C_{21}H_{41}N_3$ | 75.17 | 12.31 | 12.52 | 75.23 | 12.48 | 12.45 |
| 37 | —CH₂(cyclohexyl)— | (piperidinyl) | 154–7 | 0.15 | $C_{25}H_{46}N_2$ | 80.14 | 12.38 | 7.48 | 80.40 | 12.26 | 7.60 |
| 38 |  | (N-C₂H₅ piperidinyl) | 131–2 | 0.22 | $C_{20}H_{38}N_2$ | 78.36 | 12.50 | 9.14 | 78.46 | 12.63 | 9.31 |
| 39 |  | (2,2,6,6-tetramethylpiperidinyl-NH) | 122–4 | 0.2 | $C_{22}H_{42}N_2$ | 78.97 | 12.65 | 8.38 | 79.18 | 12.73 | 8.47 |

TABLE IV

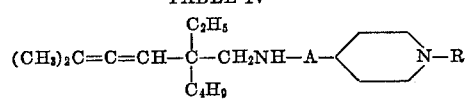

$(CH_3)_2C=C=CH-\underset{\underset{C_4H_9}{|}}{\overset{\overset{C_2H_5}{|}}{C}}-CH_2NH-A-\langle N-R \rangle$

| No. | A | R | B.P. °C. | Mm. | Molecular formula | Analysis Calc'd C | H | N | Found C | H | N |
|---|---|---|---|---|---|---|---|---|---|---|---|
| 40 | —CH₂— | H | 137–8 | 0.25 | $C_{19}H_{36}H_2$ | 78.02 | 12.41 | 9.58 | 78.21 | 12.38 | 9.50 |
| 41 | Same as above | CH₃ | 128–9 | 0.35 | $C_{20}H_{38}N_2$ | 78.36 | 12.50 | 9.14 | 78.73 | 12.20 | 8.85 |
| 42 | ___do___ | n-C₄H₉ | 145–6 | 0.20 | $C_{23}H_{44}N_2$ | 79.24 | 12.72 | 8.04 | 78.90 | 12.74 | 8.14 |
| 43 | ___do___ | —CH₂CH=CH₂ | 140–2 | 0.20 | $C_{22}H_{40}N_2$ | 79.46 | 12.12 | 8.42 | 79.34 | 12.22 | 8.57 |
| 44 | ___do___ | —CH₂—C₆H₅ | 182–5 | 0.20 | $C_{26}H_{42}N_2$ | 81.61 | 11.07 | 7.32 | 81.62 | 11.19 | 7.39 |
| 45 | ___do___ | —CH₂CH₂OH | 157–9 | 0.20 | $C_{21}H_{40}N_2O$ | 74.94 | 11.98 | 8.33 | 75.21 | 11.98 | 8.40 |
| 46 | ___do___ | —CH₂CH₂CN | 173–4 | 0.20 | $C_{22}H_{39}H_3$ | 76.46 | 11.38 | 12.16 | 76.57 | 11.61 | 12.02 |
| 47 | —CH(CH₃)— | —C₂H₅ | 136–8 | 0.20 | $C_{22}H_{42}N_2$ | 78.98 | 12.65 | 8.37 | 78.53 | 12.58 | 8.45 |
| 48 | —CH₂CH₂— | H | 140–3 | 0.20 | $C_{20}H_{39}N_2$ | 78.36 | 12.50 | 9.14 | 78.34 | 12.41 | 9.12 |

TABLE V $$R_2\phantom{xxx}R_6$$
$$\phantom{xx}\backslash\phantom{xxxx}|$$
$$\phantom{xxxx}C=C-C-CH_2NH-A-NR^1R^2$$
$$\phantom{xx}/\phantom{xxxx}|$$
$$R_4\phantom{xxx}R_5\phantom{x}R_7$$

| No. | R³ | R⁴ | R⁵ | R⁶ | R⁷ | A | NR¹R² | Molecular formula | B.P. °C. | Mm. | Calculated C | Calculated H | Calculated N | Found C | Found H | Found N |
|---|---|---|---|---|---|---|---|---|---|---|---|---|---|---|---|---|
| 49 | H | H | CH₃ | C₂H₅ | C₂H₅ | —(CH₂)₃— | —N(C₂H₅)₂ | C₁₉H₃₉N₂ | 115-7 | 0.20 | 77.48 | 13.01 | 9.51 | 77.49 | 12.72 | 9.53 |
| 50 | H | C₆H₁₃ | H | CH₃ | CH₃ | —(CH₂)₃— | —NH₂ | C₁₆H₃₅N₂ | 110-4 | 0.30 | 76.12 | 12.78 | 11.10 | 75.93 | 12.67 | 10.50 |
| 51 | H | n-C₃H₇ | H | CH₃ | CH₃ | —(CH₂)₂— | —N(C₂H₅)₂ | C₁₇H₃₇N₂ | 109-111 | 0.30 | 76.62 | 12.86 | 10.52 | 76.42 | 12.95 | 10.55 |
| 52 | CH₃ | C₂H₅ | H | CH₃ | CH₃ | Same | do | C₁₇H₃₇N₂ | 105-7 | 0.30 | 76.62 | 12.86 | 10.52 | 76.90 | 12.90 | 10.22 |
| 53 | H | C₂H₅ | H | —CH=CH C₆H₅ | C₂H₅ | do | do | C₂₁H₄₀N₂ | 120-1 | 0.15 | 78.69 | 12.57 | 8.74 | 79.07 | 12.59 | 8.82 |
| 54 | CH₃ | —CH₂CH₂—CH₂=CH | H | C₂H₅ | C₂H₅ | do | do | C₂₃H₄₄N₂ | 143-4 | 0.25 | 79.24 | 12.72 | 8.04 | 79.02 | 12.58 | 8.07 |
| 55 | CH₃ | C₆H₁₃ | H | CH₃ | CH₃ | do | do | C₂₁H₄₉N₂ | 128-130 | 0.25 | 78.18 | 13.12 | 8.69 | 78.47 | 13.40 | 8.94 |
| 56 | CH₃ | CH₃ | H | CH₃ | CH₃ | —(CH₂)₁— | 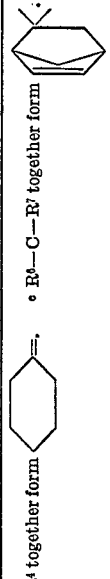 | C₁₅H₃₂N₃ | 106-8 | 0.30 | 71.66 | 11.63 | 16.72 | 71.85 | 11.59 | 16.78 |
| 57ª | CH₃ | CH₃ | H | —(CH₂)₂CH=CH—CH₂— | —(CH₂)₂— | —N(C₂H₅)₂ | C₁₉H₃₈N₂ | 117-120 | 0.18 | 78.56 | 11.80 | 9.64 | 78.47 | 11.85 | 9.57 |
| 58ᵇ | | —(CH₂)₅— | H | C₂H₅ | C₂H₅ | Same | do | C₂₁H₄₄N₂ | 150-3 | 0.20 | 79.24 | 12.72 | 8.04 | 79.28 | 12.49 | 7.98 |
| 59ᵃ,ᵇ | | —(CH₂)₅— | H | —(CH₂)₂CH=CH CH₂— | C₂H₅ | do | do | C₂₂H₃₈N₂ | 145-6 | 0.15 | 79.93 | 11.59 | 8.48 | 80.11 | 11.43 | 8.44 |
| 60ᶜ | | CH₃ | H | CH₃ | CH₃ | do | do | C₂₀H₃₈N₂ | 140-2 | 0.20 | 79.41 | 11.33 | 9.26 | 79.59 | 11.58 | 8.53 |

ª R₄—C—R⁷ together form [cyclohexyl-dimethyl];    ᵇ R³—C—R⁴ together form [cyclohexenyl];    ᶜ R⁶—C—R⁷ together form [methylcyclopentyl]

EXAMPLE 27

This example together with Tables VI and VII illustrates anticoagulant activity for the compounds of this invention. Table VII shows effects of the anticoagulants on whole blood clotting time. Table VI shows the effect of the anticoagulants on platelet aggregation. Briefly, the in vitro method employed for measuring anti-aggregation activity involves the addition of adenosine diphosphate (ADP) to platelet-rich plasma and measuring the inhibitory effect on platelet aggregation when the plasma also contains a compound of this invention. Adenosine diphosphate is a material known to cause platelet aggregation. In the in vitro method, the anticoagulant compound is added to the platelet-rich plasma (PRP) and the inhibitory effect on aggregation is determined after addition of the ADP, by comparison to the effects of ADP alone. The degree of aggregation was measured by the decrease in light scattering of platelet-rich plasma as described by Mustard, J. F. et al., J. Lab. Clin. Med. 64, 548 (1964).

The whole blood clotting time of rat blood was determined on blood obtained from a tail vein and placed in a siliconized capillary tube. Determination was made according to the method of Sabaraye (Kolmer, Spalding and Robinson, Approved Laboratory Techniques, pages 110–111).

The following Tables VI and VII show the results obtained in this Example 27. The meaning of various abbreviations or designators used in these tables are as follows: s.c. for subcutaneous; p.o. for per os (orally); S.E. for standard error; μg for micrograms. The compound numbers correspond to compound numbers shown in the examples and Tables II to V.

TABLE VI

[In vitro effect of various allene derivatives on the inhibition of platelet aggregation caused by adenosine diphosphate in platelet-rich human plasma]

| Compound No. | Concentration (mg./ml.) plasma | Percent inhibition of degree aggregation |
|---|---|---|
| 1 | 100 | 85 |
| 2 | 100 | 93 |
| 3 | 100 | 50 |
| 4 | 100 | 28 |
| 5 | 100 | 64 |
| 6 | 100 | 100 |
| 7 | 100 | 100 |
| 8 | 100 | 37 |
| 9 | 100 | 100 |
| 10 | 100 | 100 |
| 11 | 100 | 100 |
| 12 | 100 | 100 |
| 13 | 100 | 100 |
| 14 | 100 | 100 |
| 15 | 100 | 72 |
| 16 | 100 | 100 |
| 17 | 30 | 41 |
| 18 | 100 | 100 |
| 19 | 100 | 100 |
| 20 | 100 | 100 |
| 21 | 100 | 93 |
| 23 | 100 | 100 |
| 25 | 100 | 100 |
| 26 | 100 | 100 |
| 27 | 100 | 55 |
| 28 | 30 | 37 |
| 30 | 100 | 100 |
| 31 | 100 | 100 |
| 32 | 100 | 100 |
| 33 | 100 | 100 |
| 35 | 100 | 71 |
| 36 | 100 | 100 |
| 38 | 100 | 38 |
| 39 | 100 | 100 |
| 40 | 100 | 100 |
| 41 | 30 | 75 |
| 42 | 100 | 100 |
| 44 | 100 | 41 |
| 45 | 100 | 100 |
| 46 | 100 | 73 |
| 47 | 100 | 100 |
| 48 | 100 | 100 |
| 50 | 30 | 71 |
| 51 | 100 | 100 |
| 52 | 100 | 100 |
| 53 | 100 | 100 |
| 54 | 100 | 100 |
| 55 | 100 | 100 |
| 56 | 100 | 80 |
| 57 | 30 | 38 |
| 58 | 100 | 100 |
| 59 | 100 | 100 |
| 60 | 100 | 100 |

TABLE VII

[In vivo effect of compound No. 14 on the whole blood clotting time in the rat]

| | | | | Clotting time (in seconds) ± S.E. | | | | |
|---|---|---|---|---|---|---|---|---|
| | | | | Control | Time after compound administration | | | |
| Compound No. | Route | Dose, mg./kg. | Number in group | | 1 hr. | 2 hrs. | 4 hrs. | 5 hrs. |
| Control | P.o. | 1 ml. isotonic saline | 6 | 370±24 | | 420±15 | | 430±8 |
| 14 | S.c. | 30 | 6 | 400±10 | 410±13 | | [2] 580±49 | |
| | P.o. | 30 | 6 | 395±12 | | [1] 610±81 | | [3] 895±77 |

[1] P value <.05.  [2] P value <.02.  [3] P value <.001.

What is claimed is:

1. A compound selected from a base of the formula

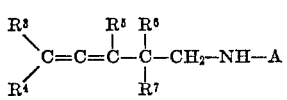

wherein:

$R^3$ is hydrogen, (lower)alkyl or (lower)alkenyl;

$R^4$ is (lower)alkyl or (lower)alkenyl; or $R^3$ and $R^4$ taken together with the carbon atom to which they are attached is cycloalkyl of 5 to 7 ring carbon atoms;

$R^5$ is hydrogen or (lower)alkyl; each of $R^6$ and $R^7$ is (lower)alkyl, (lower)alkenyl, or $R^6$ and $R^7$ together with the carbon atom to which they are attached is cycloalkyl of 5 to 7 ring carbon atoms, cycloalkenyl of 5 to 7 ring carbon atoms, or bicycloalkyl selected from bornyl, norbornyl or norbornenyl; and A is the group $$-X-N\begin{matrix}R^1\\R^2\end{matrix}$$

wherein X is alkylene of 2 to about 8 carbon atoms and separates the adjacent nitrogen atoms by an alkylene chain of at least 2 carbon atoms, monohydroxy alkylene of 3 to about 8 carbon atoms and separates the adjacent nitrogen atoms by an alkylene chain of at least 3 carbon atoms, or a cycloalkyl-substituted alkylene group of the formula $$-(CH_2)_v-C-(CH_2)_{v'}-\\ \phantom{xxxx}(CH_2)_\mu$$

wherein each of $v$ and $v'$ is an integer of 0 to 4, $\mu$ is an integer of 3 to 5 provided that at least one of $v$ and $v'$ is 1, and that the total of $v$, $v'$ and $\mu$ is not greater than 8, $R^1$ is hydrogen, (lower)alkyl, phenyl, hydroxy(lower)alkyl, cycloalkyl of 4 to 6 ring carbon atoms, or di(lower)alkylamino(lower)alkyl; and $R^2$ is hydrogen, (lower)alkyl, or hydroxy(lower)alkyl, or pharmaceutically acceptable acid addition salts of said base.

2. A compound of claim 1 wherein $R^5$ is hydrogen.

3. A compound of claim 2 wherein each of $R^3$, $R^4$, $R^6$ and $R^7$ is (lower)alkyl, and A is the group $$-X-N\begin{matrix}R^1\\R^2\end{matrix}$$

wherein X is alkylene of 2 to 8 carbon atoms and each of $R^1$ and $R^2$ is (lower)alkyl.

4. A compound of claim 2 wherein each of $R^3$, $R^4$, $R^6$ and $R^7$ is (lower)alkyl and A is the group $$-X-N\begin{matrix}R^1\\R^2\end{matrix}$$

wherein X is alkylene of 2 to 8 carbon atoms and each of $R^1$ and $R^2$ is hydrogen.

5. A compound of claim 2 wherein each of $R^3$, $R^4$, $R^6$ and $R^7$ is (lower)alkyl and A is the group $$-X-N\begin{matrix}R^1\\R^2\end{matrix}$$

wherein X is alkylene of 2 to 8 carbon atoms, $R^1$ is hydrogen and $R^2$ is (lower)alkyl.

6. A compound of claim 2 wherein each of $R^3$, $R^4$, $R^6$ and $R^7$ is (lower)alkyl and A is the group $$-X-N\begin{matrix}R^1\\R^2\end{matrix}$$

wherein X is alkylene of 2 to 8 carbon atoms, $R^1$ is hydrogen and $R^2$ is hydroxy(lower)alkyl.

7. A compound of claim 2 wherein each of $R^3$, $R^4$, $R^6$ and $R^7$ is (lower)alkyl and A is the group $$-X-N\begin{matrix}R^1\\R^2\end{matrix}$$

wherein X is alkylene of 2 to 8 carbon atoms, R¹ is hydrogen and R² is cycloalkyl.

8. A compound of claim 2 wherein each of R³, R⁴, R⁶ and R⁷ is (lower)alkyl and A is the group

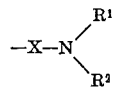

wherein X is alkylene of 2 to 8 carbon atoms, R¹ is di(lower)alkylamino(lower)alkyl and R² is hydrogen.

9. A compound of claim 2 wherein each of R⁴, R⁶ and R⁷ is (lower)alkyl, R³ is hydrogen and A is the group

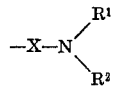

wherein X is alkylene of 2 to 8 carbon atoms and each of R¹ and R² is (lower)alkyl.

10. A compound of claim 2 wherein each of R³ and R⁴ is (lower)alkyl, R⁶ and R⁷ together with the carbon atom to which they are attached is cycloalkenyl and A is the group

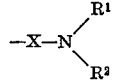

wherein X is alkylene of 2 to 8 carbon atoms and each of R¹ and R² is (lower)alkyl.

11. A compound of claim 2 wherein each of R³ and R⁴ is (lower)alkyl, R⁶ is (lower)alkenyl, R⁷ is (lower)alkyl and A is the group

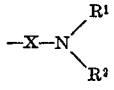

wherein X is alkylene of 2 to 8 carbon atoms and each of R¹ and R² is (lower)alkyl.

12. A compound of claim 2 wherein R³ and R⁴ together with the carbon to which they are attached is cycloalkyl of 5 to 7 ring carbon atoms; each of R⁶ and R⁷ is (lower)alkyl or R⁶ and R⁷ together with the carbon to which they are attached is cycloalkyl of 5 to 7 carbon atoms; and A is the group

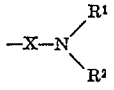

wherein X is alkylene of 2 to 8 carbon atoms and each of R¹ and R² is (lower)alkyl.

13. A compound of claim 2 wherein each of R³ and R⁴ is (lower)alkyl, R⁶ and R⁷ together with the carbon to which they are attached to norbornenyl and A is the group

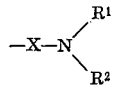

wherein X is alkylene of 2 to 8 carbon atoms, and each of R¹ and R² is (lower)alkyl.

14. A compound of claim 2 wherein each of R³, R⁴, R⁶ and R⁷ is (lower)alkyl and A is the group

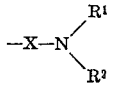

wherein X is hydroxyalkylene of 3 to 8 carbon atoms and each of R¹ and R² is (lower)alkyl.

15. A compound selected from a base of the formula

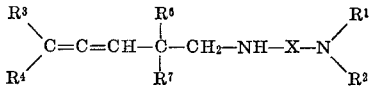

wherein each of R³, R⁴, R⁶ and R⁷ is (lower)alkyl; X is alkylene of 2 to 6 carbon atoms; R¹ is hydrogen, (lower)alkyl, phenyl, hydroxy(lower)alkyl, cycloalkyl of 5 to 7 ring carbon atoms, di(lower)alkylamino(lower)alkyl; R² is hydrogen, (lower)alkyl, or hydroxy(lower)alkyl; or a pharmaceutically acceptable acid addition salt of said base.

16. A compound of claim 15 wherein each of R¹ and R² is hydrogen.

17. A compound of claim 15 wherein R² is hydrogen and R¹ is (lower)alkyl.

18. A compound of claim 15 wherein R² is hydrogen and R¹ is hydroxy(lower)alkyl.

19. A compound of claim 15 wherein each of R¹ and R² is (lower)alkyl.

20. A compound of claim 15 wherein each of R¹ and R² is hydroxy(lower)alkyl.

References Cited

UNITED STATES PATENTS 2,073,363  3/1937  Carothers et al. ____ 260—583 H
2,136,177  11/1938  Carothers et al. ___ 260—583 H CHARLES B. PARKER, Primary Examiner R. I. RAYMOND, Assistant Examiner U.S. Cl. X.R.

260—239 E, 247.5 R, 268 R, 290 V, 293 R, 294.7 R, 309.6, 326.85, 563 R, 570.5 P, 584 R; 424—325, 330

PO-1050
(5/69)

UNITED STATES PATENT OFFICE
CERTIFICATE OF CORRECTION

Patent No. 3,641,155      Dated February 8, 1972

Inventor(s) Charles H. Tilford, Thomas R. Blohm and Robert D. MacKenzie

It is certified that error appears in the above-identified patent and that said Letters Patent are hereby corrected as shown below:

Column 2, line 10, formula $\begin{smallmatrix} R_5 & R_6 \\ | & | \\ C & C \end{smallmatrix}$ should read $\begin{smallmatrix} R^5 & R^6 \\ | & | \\ C & C \end{smallmatrix}$.

Column 14, No. 23, Molecular Formula, "$C_{20}H_{40}H_2O$" should read "$C_{20}H_{40}N_2O$"; Column 14, B.P. °C, No. 26, "130-7" should read "130-3"; Column 14, No. 29, NR'R² NJ , should read "NR'R²-NJ . Column 15, No. 40, Molecular Formula $C_{19}H_{36}H_2$ should read "$C_{19}H_{36}N_2$"; Column 15, No. 46, Molecular Formula "$C_{22}H_{39}H_3$" should read "$C_{22}H_{39}N_3$". Column 17, No. 49, A, "$-(CH_2)_3-$" should read "$-(CH_2)_3-$". Column 22, claim 13, line 3, "attached to norbornenyl" should read "attached is norbornenyl".

Signed and sealed this 4th day of June 1974.

(SEAL)
Attest:

EDWARD M. FLETCHER, JR.
Attesting Officer

C. MARSHALL DANN
Commissioner of Patents